US010198430B2

(12) United States Patent
Dwarakanath et al.

(10) Patent No.: US 10,198,430 B2
(45) Date of Patent: Feb. 5, 2019

(54) AUTOMATED FUNCTIONAL DIAGRAM GENERATION

(71) Applicant: Accenture Global Services Limited, Dublin (IE)

(72) Inventors: Anurag Dwarakanath, Bangalore (IN); Aditya Priyadarshi, Bangalore (IN); Bhanu Anand, Raleigh, NC (US); Bindu Madhav Tummalapalli, Bengaluru (IN); Bargav Jayaraman, Hosur (IN); Nisha Ramachandra, Bangalore (IN); Anitha Chandran, Bangalore (IN); Parvathy Vijay Raghavan, Hyderabad (IN); Shalini Chaudhari, Hyderabad (IN); Neville Dubash, Mumbai (IN); Sanjay Podder, Thane (IN)

(73) Assignee: Accenture Global Services Limited, Dublin (IE)

( * ) Notice: Subject to any disclaimer, the term of this patent is extended or adjusted under 35 U.S.C. 154(b) by 161 days.

(21) Appl. No.: 15/247,286

(22) Filed: Aug. 25, 2016

(65) Prior Publication Data

US 2017/0060840 A1  Mar. 2, 2017

(30) Foreign Application Priority Data

Aug. 28, 2015 (IN) .......................... 4525/CHE/2015

(51) Int. Cl.
*G06F 17/27* (2006.01)
*G06F 11/00* (2006.01)
(Continued)

(52) U.S. Cl.
CPC .......... *G06F 17/2775* (2013.01); *G06F 8/425* (2013.01); *G06F 8/74* (2013.01);
(Continued)

(58) Field of Classification Search
CPC combination set(s) only.
See application file for complete search history.

(56) References Cited

U.S. PATENT DOCUMENTS 8,090,724 B1 *  1/2012  Welch ............... G06F 17/30616
707/750
2005/0240394 A1   10/2005  Oda
(Continued)

OTHER PUBLICATIONS

Guthrie, D. et al., "A Closer Look at Skip-gram Modelling", 2006, retrieved from the internet, URL: http://homepages.inf.ed.ac.uk/ballison/pdf/lrec_skipgrams.pdf.
(Continued)

*Primary Examiner* — Vu B Hang
(74) *Attorney, Agent, or Firm* — Harrity & Harrity, LLP

(57) ABSTRACT

A device may obtain a test script document. The device may process the test script document to perform term extraction using one or more term extraction techniques to identify a set of terms of the test script document. The one or more term extraction techniques may include a skip n-gram term extraction technique. One or more terms, of the set of terms, may be located within an n-gram of the test script document. The device may process the test script document to perform hierarchy formation for results of performing term extraction. A relationship between a set of terms, of the set of terms, may be identified using hierarchy formation. The device may generate a functional diagram of the test script document based on the results of performing term extraction and results of performing hierarchy formation. The device may provide information identifying the functional diagram.

20 Claims, 12 Drawing Sheets

(51) Int. Cl.
*G06F 8/41* (2018.01)
*G06F 8/74* (2018.01)

(52) U.S. Cl.
CPC .......... *G06F 11/00* (2013.01); *G06F 17/2785* (2013.01); *G06F 17/2755* (2013.01)

(56) References Cited

U.S. PATENT DOCUMENTS

2007/0150772 A1* 6/2007 Berenbach .......... G06F 11/2257
  714/25
2007/0219945 A1* 9/2007 Wang .................... G06F 17/272
2013/0138641 A1  5/2013 Korolev et al.

OTHER PUBLICATIONS

Carrot2, "About," http://project.carrot2.org/, Aug. 28, 2010, 1 page.
Weiss, "Descriptive Clustering as a Method for Exploring Text Collections," http://www.cs.put.poznan.pl/dweiss/site/publications/download/dweiss-phd-thesis.pdf, 2006, 143 pages.
Matsuo et al., "Keyword Extraction from a Single Document using Word Co-occurrence Statistical Information," https://www.aaai.org/Papers/FLAIRS/2003/Flairs03-076.pdf, 5 pages.
Frantzi et al., "Automatic Recognition of Multi-Word Terms: the C-value/NC-value Method," http://personalpages.manchester.ac.uk/staff/sophia.ananiadou/ijodl2000.pdf, 17 pages.
Justeson et al., "Technical terminology: some linguistic properties and an algorithm for identification in text," https://brenocon.com/JustesonKatz1995.pdf, 21 pages.

* cited by examiner

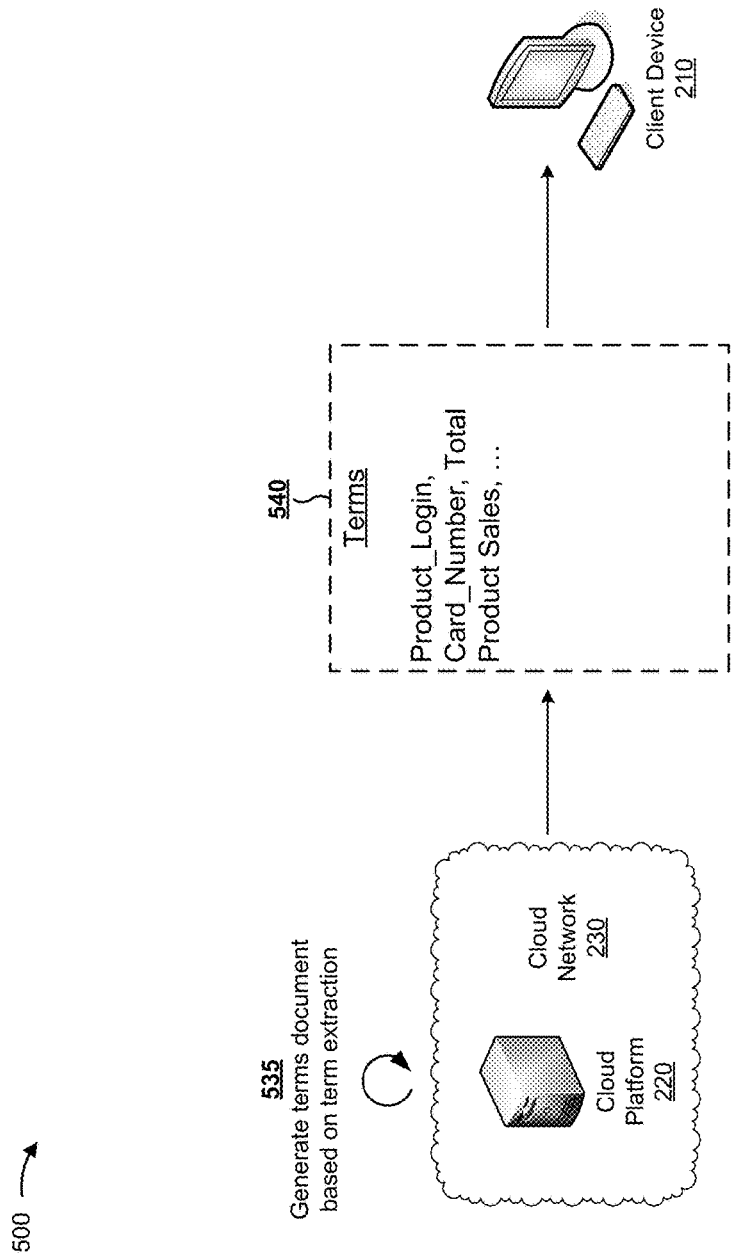

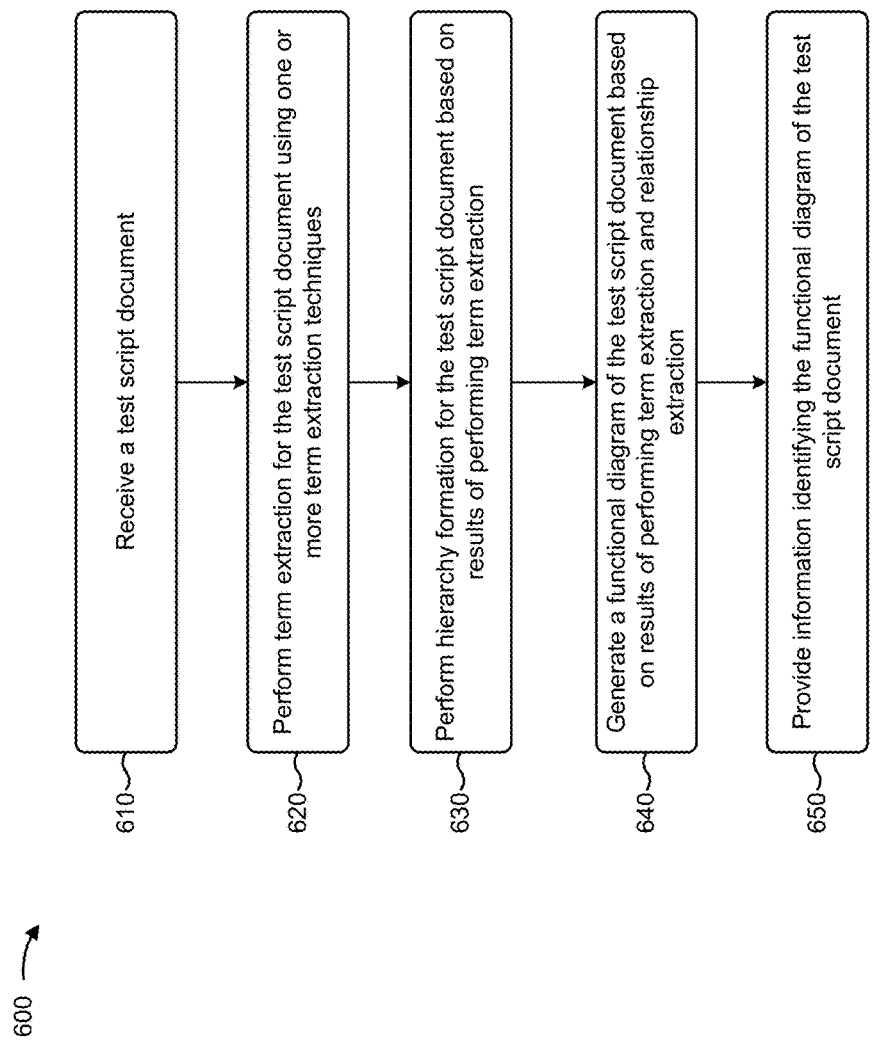

AUTOMATED FUNCTIONAL DIAGRAM GENERATION

RELATED APPLICATION

This application claims priority under 35 U.S.C. § 119 to Indian Patent Application No. 4525/CHE/2015, filed on Aug. 28, 2015, the content of which is incorporated by reference herein in its entirety.

BACKGROUND

Term extraction may be used to identify relevant terms within a body of information for a number of different purposes. For example, term extraction may be used in analyzing medical texts, legal texts, or the like. Term extraction is a form of information extraction, which often includes processing human language texts by means of natural language processing.

SUMMARY

According to some possible implementations, a device may include one or more processors. The one or more processors may obtain a test script document. The test script document may include a set of test scripts. The one or more processors may process the test script document to perform term extraction using one or more term extraction techniques to identify a set of terms of the test script document. The one or more term extraction techniques may include a skip n-gram term extraction technique. One or more terms, of the set of terms, may be located within an n-gram of the test script document. The n-gram may be identified using the skip n-gram term extraction technique. The one or more processors may process the test script document to perform hierarchy formation for results of performing term extraction. A relationship between a set of terms, of the set of terms, may be identified using hierarchy formation. The one or more processors may generate a functional diagram of the test script document based on the results of performing term extraction and results of performing hierarchy formation. The one or more processors may provide information identifying the functional diagram.

According to some possible implementations, a computer-readable medium may store one or more instructions that, when executed by one or more processors, may cause the one or more processors to obtain a test script document. The test script document may include a set of test scripts for testing functionality of program code. The one or more instructions, when executed by one or more processors, may cause the one or more processors to extract a set of terms from the test script document using a set of term extraction techniques. The set of term extraction techniques may include a skip n-gram term extraction technique. The one or more instructions, when executed by one or more processors, may cause the one or more processors to determine a set of relationships for the set of terms based on the test script document. The one or more instructions, when executed by one or more processors, may cause the one or more processors to generate a functional diagram representing the test script document based on the set of terms and the set of relationships for the set of terms. The one or more instructions, when executed by one or more processors, may cause the one or more processors to provide the functional diagram for display.

According to some possible implementations, a method may include obtaining, by a device, a test script document. The test script document may include a set of test scripts. The method may include processing, by the device, the test script document to perform term extraction using one or more term extraction techniques to identify a set of terms of the test script document. The method may include processing, by the device, the test script document to perform hierarchy formation for results of performing term extraction. A relationship between a set of terms, of the set of terms, may be identified using hierarchy formation. The method may include generating, by the device, a functional diagram of the test script document based on the results of performing term extraction and results of performing hierarchy formation. The method may include providing, by the device, information identifying the functional diagram.

BRIEF DESCRIPTION OF THE DRAWINGS

FIGS. 5A-5C are diagrams of an example implementation relating to the example process shown in FIG. 4;

FIG. 6 is a flow chart of an example process for generating a functional diagram to represent a set of test scripts.

DETAILED DESCRIPTION

The following detailed description of example implementations refers to the accompanying drawings. The same reference numbers in different drawings may identify the same or similar elements.

A test script is a set of instructions to be performed on a system to determine whether the system functions as expected. For example, a test script may include a software program used to test the functionality of a software system or of program code included in the software system. In software testing, a coverage analysis may be performed to determine whether a set of test scripts sufficiently covers program code of the software system that is to be tested. In performing a coverage analysis, a test script document may be represented using a functional diagram, such as an application flow diagram or the like. As a test script document may include a large number of test scripts, constructing such a functional diagram may require many man hours and may be prone to error.

Implementations, described herein, may provide a cloud platform that automatically generates a functional diagram that represents a test script document. The cloud platform may utilize one or more term extraction techniques to analyze the test script document and to extract terms significant to generating a functional diagram. The cloud platform may also apply relationship extraction to identify relationships, among the extracted terms, that are significant to generating a functional diagram. In this way, the cloud platform may reduce time required to generate a functional diagram, may reduce consumption of power and computing resources required to generate the functional diagram, and may improve accuracy of the functional diagram relative to a person being required to manually create a functional diagram.

Furthermore, some types of information may include sequences of words or characters (e.g., of a test script) that are repeated with a greater frequency relative to other types of information. For example, such types of information may include a number of repeated skip n-grams (e.g., repeated sequences of words or characters within which one or more words or characters may be different). Implementations, described herein, may provide a cloud platform that identifies skip n-grams in a document and utilizes words or characters included in the skip n-grams as terms for term extraction. In this way, the cloud platform may improve accuracy and efficiency of term extraction for documents, may reduce time required to perform term extraction, and may reduce consumption of power and resources required to perform term extraction relative to other term extraction techniques. Based on using a skip n-gram term extraction technique to extract terms from a test script document, the cloud platform may improve a speed and accuracy of term extraction for generating a functional diagram of the test script document.

Figure 1:
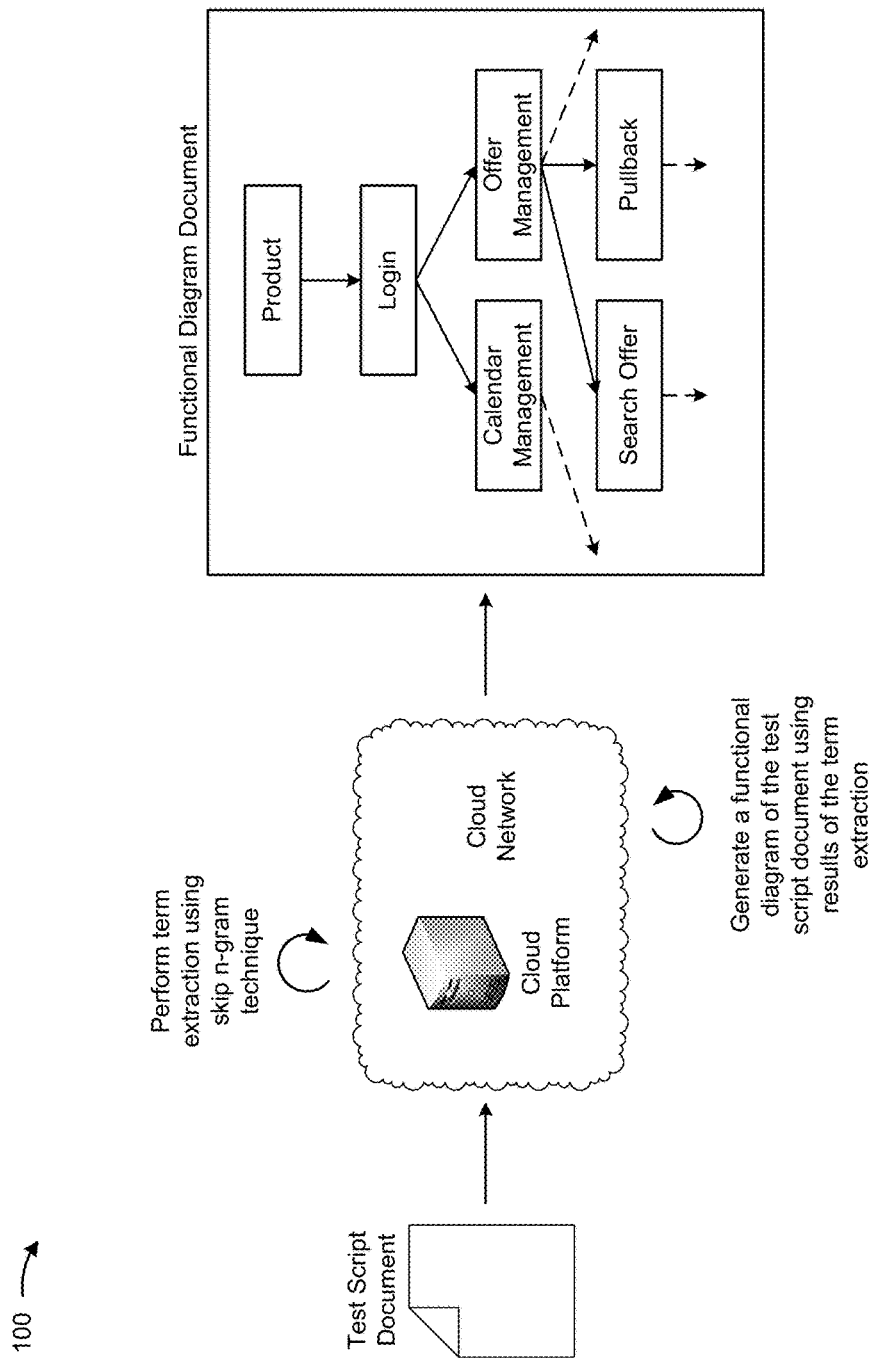
FIG. 1 is a diagram of an overview of an example implementation described herein.

FIG. 1 is a diagram of an overview of an example implementation 100 described herein. As shown in FIG. 1, example implementation 100 includes a cloud network that includes a cloud platform. As further shown in FIG. 1, the cloud platform may obtain a test script document. For example, the test script document may include a set of test scripts.

In some implementations, the cloud platform may process the test script document to perform term extraction using one or more term extraction techniques to identify a set of terms of the test script document. For example, the one or more term extraction techniques may include a technique based on index terms, technical terminology, glossary terms, collocations of words, multi-word expressions, keywords, key-phrases, topics, or the like. In some implementations, the cloud platform may employ multiple term extraction techniques to achieve a better coverage of terms.

In some implementations, the cloud platform may perform a term extraction technique that identifies n-grams. An n-gram may include a consecutive sequence of n items such as words, characters, or the like. For example, word based 2-grams in "The rain in Spain" may include "The rain", "rain in", and "in Spain".

In some implementations, the one or more term extraction techniques may include a skip n-gram term extraction technique to extract a set of terms, of the set of test scripts, that are located within a set of n-grams of the set of test scripts. A skip n-gram is a variant of an n-gram in which the sequence of n items may include gaps that may be skipped over. In some implementations, a word-based k-skip n-gram may include a sequence of n words, with as many as a skip value quantity, k, words that may be skipped over. For example, word-based 1-skip 2-grams in "The rain in Spain" may include "The rain", "The in", "rain in", "rain Spain", and "in Spain". In some implementations, a word-based k-skip n-gram may include a sequence of n words, with exactly k words skipped over. For example, word-based 1-skip 2-grams in "The rain in Spain" may include "The in" and "rain Spain". In some implementations, a character-based k-skip n-gram may include a sequence of n characters, with as many as a skip value quantity, k, characters that may be skipped over.

Test script documents may contain repeated skip n-grams with a greater frequency than another type of document, such as a prose document or the like. For example, in a test script document, the pattern "call <*>" may be repeated, where "*" represents a different variable, function, or the like. In this case, a skip n-gram may be defined as "call <*>", where "*" represents one or more words that may be skipped over. For example, "call <*>" may be repeated in the form of "call <login>", "call <welcome>", and "call <offer>". In some implementations, the cloud platform may select, as terms to be extracted, one or more words or one or more characters that are skipped over in a skip n-gram. In this case, continuing with the example of "call <login>", "call <welcome>", and "call <offer>", the cloud platform may select "login", "welcome", and "offer" as terms to be extracted.

In some implementations, the cloud platform may process the test script document to perform hierarchy formation (e.g., to identify a set of relationships between multiple terms) based on results of performing the term extraction. For example, the cloud platform may perform relationship extraction to determine relationships among extracted terms, and may determine a hierarchy of terms based on the relationships determined.

As further shown in FIG. 1, the cloud platform may generate a functional diagram of the test script document using results of the term extraction. For example, where "Product Portal" and "Login" have been extracted as terms, the functional diagram may include a "Product Portal" block and a "Login" block. In some implementations, the cloud platform may generate a functional diagram of the test script document based on the results of performing term extraction and the results of performing hierarchy formation. For example, where cloud platform 220 has determined a hierarchical relationship in which "Login" is subordinate to "Product Portal," the hierarchical relationship may be represented by placing the "Product Portal" block above the "Login" block in the functional diagram, and by providing an arrow connector from the "Product Portal" block to the "Login" block, as shown.

The cloud platform may provide information identifying the functional diagram. For example, as shown in FIG. 1, the cloud platform may provide a functional diagram document which illustrates a hierarchy of extracted terms based on the hierarchy formation. The functional diagram may be used to represent the test scripts in a coverage analysis to determine whether the set of test scripts sufficiently covers the software code to be tested.

In this way, the cloud platform generates a functional diagram document for utilization in performing coverage analysis. Based on automatically generating the functional diagram document, the cloud platform improves a speed of creating the functional diagram document and an accuracy of the functional diagram relative to a person being required to manually generate the functional diagram. Moreover, based on using a skip n-gram technique, the cloud platform identifies terms for the functional diagram with a greater accuracy relative to another term extraction technique.

As indicated above, FIG. 1 is provided merely as an example. Other examples are possible and may differ from what was described with regard to FIG. 1.

Figure 2:
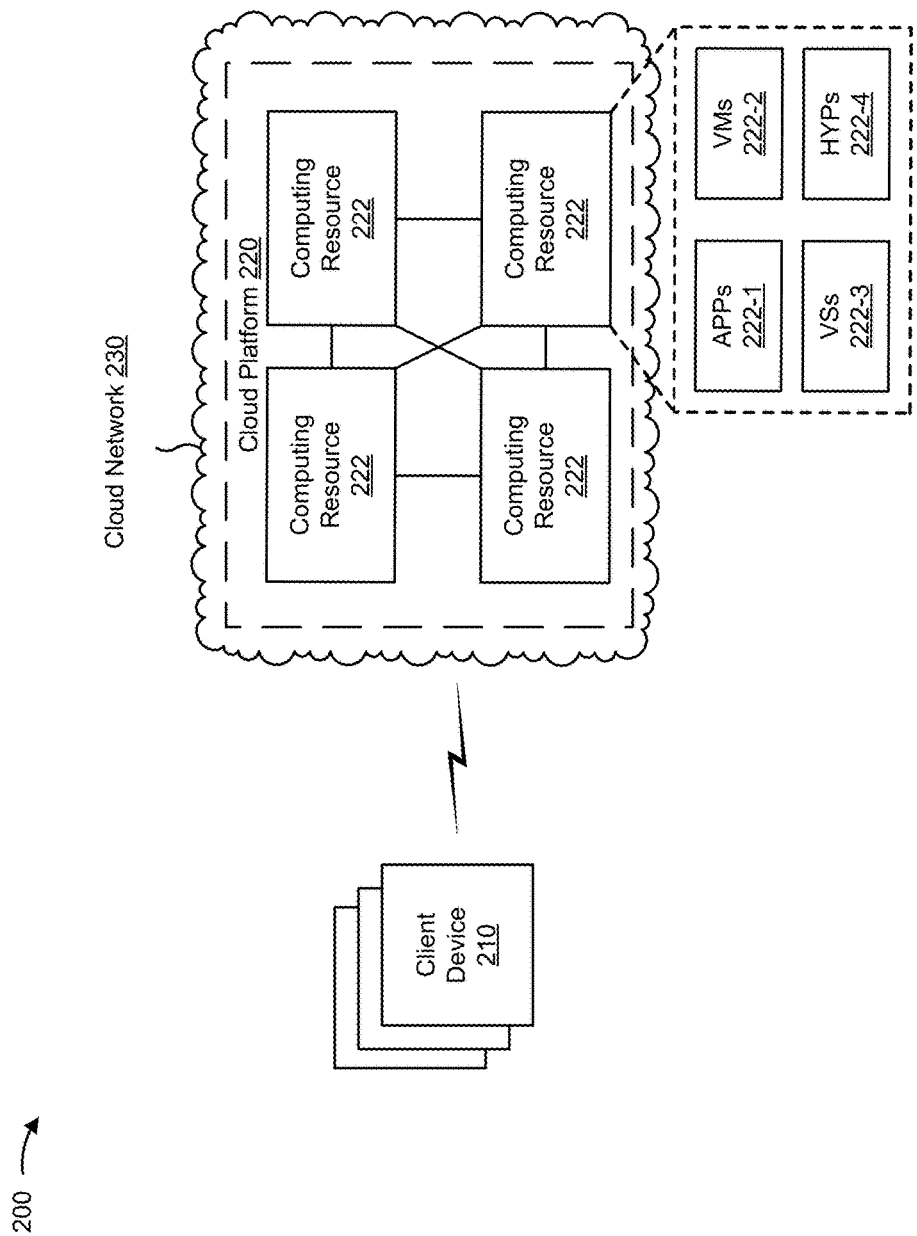
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210 (hereinafter referred to individual as "client device 210," and collectively as "client devices 210") and a cloud platform 220 hosted within a cloud network 230. Devices of environment 200 may interconnect via wired connections, wireless connections, or a combination of wired and wireless connections.

Client device 210 includes one or more devices capable of receiving, generating, storing, processing, and/or providing information associated with extracting information from a document, such as identifying a set of terms in the document, generating a functional diagram to represent the document, or the like. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Cloud platform 220 includes one or more devices capable of extracting information from a document, such as identifying a set of terms in the document, generating a functional diagram to represent the document, or the like, as described elsewhere herein. For example, cloud platform 220 may include a cloud server or a group of cloud servers. In some implementations, cloud platform 220 may be designed to be modular such that certain software components can be swapped in or out depending on a particular need. As such, cloud platform 220 may be easily and/or quickly reconfigured for different uses.

In some implementations, as shown, cloud platform 220 may be hosted in cloud network 230. Notably, while implementations described herein describe cloud platform 220 as being hosted in cloud network 230, in some implementations, cloud platform 220 may not be cloud-based (i.e., may be implemented outside of a cloud computing environment) or may be partially cloud-based.

Cloud network 230 includes an environment that hosts cloud platform 220. Cloud network 230 may provide computation, software, data access, storage, etc. services that do not require end-user (e.g., client device 210) knowledge of a physical location and configuration of system(s) and/or device(s) that hosts cloud platform 220. As shown, cloud network 230 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host cloud platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, one or more virtualized storages ("VSs") 222-3, and/or one or more hypervisors ("HYPs") 222-4.

Application 222-1 includes one or more software applications that may be provided to or accessed by client device 210. Application 222-1 may eliminate a need to install and execute the software applications on client device 210. For example, application 222-1 may include software associated with cloud platform 220 and/or any other software capable of being provided via cloud network 230. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 210), and may manage infrastructure of cloud network 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
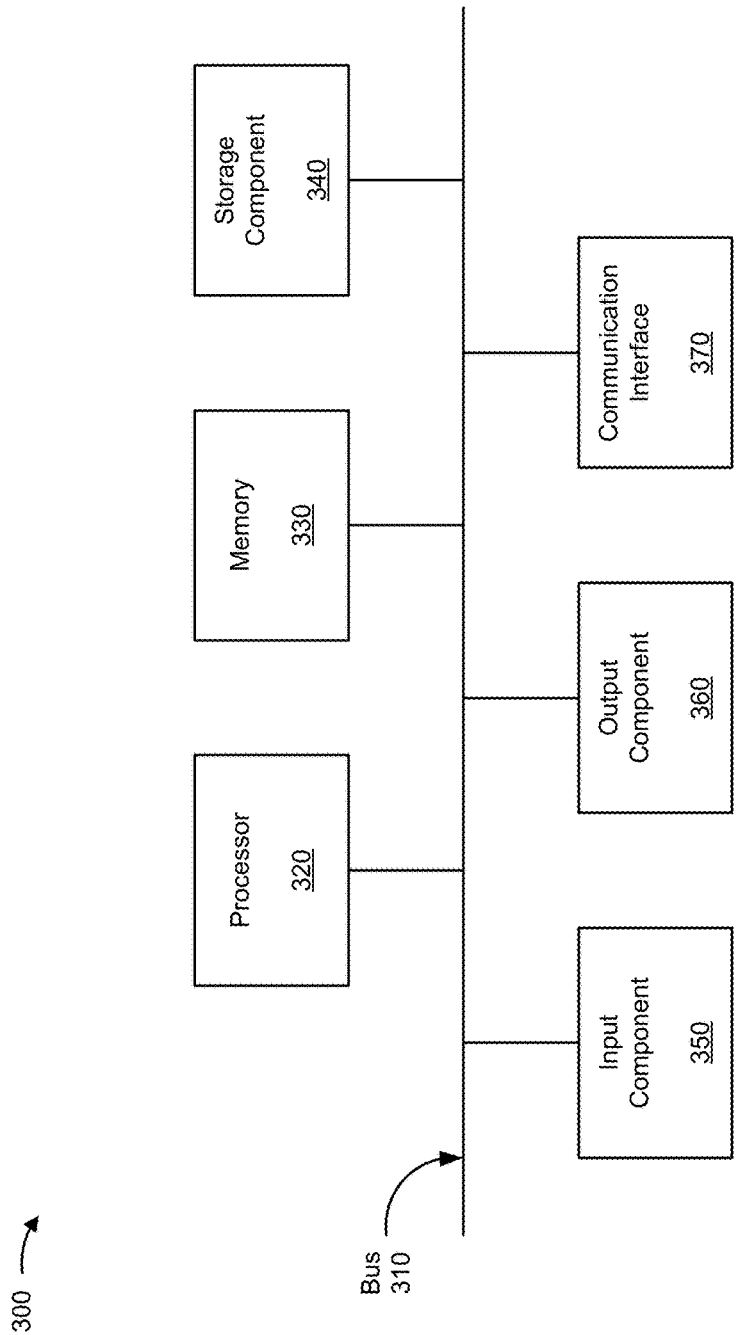
FIG. 3 is a diagram of example components of one or more devices of FIG. 2.

FIG. 3 is a diagram of example components of a device 300. Device 300 may correspond to client device 210 and/or cloud platform 220. In some implementations, client device 210 and/or cloud platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
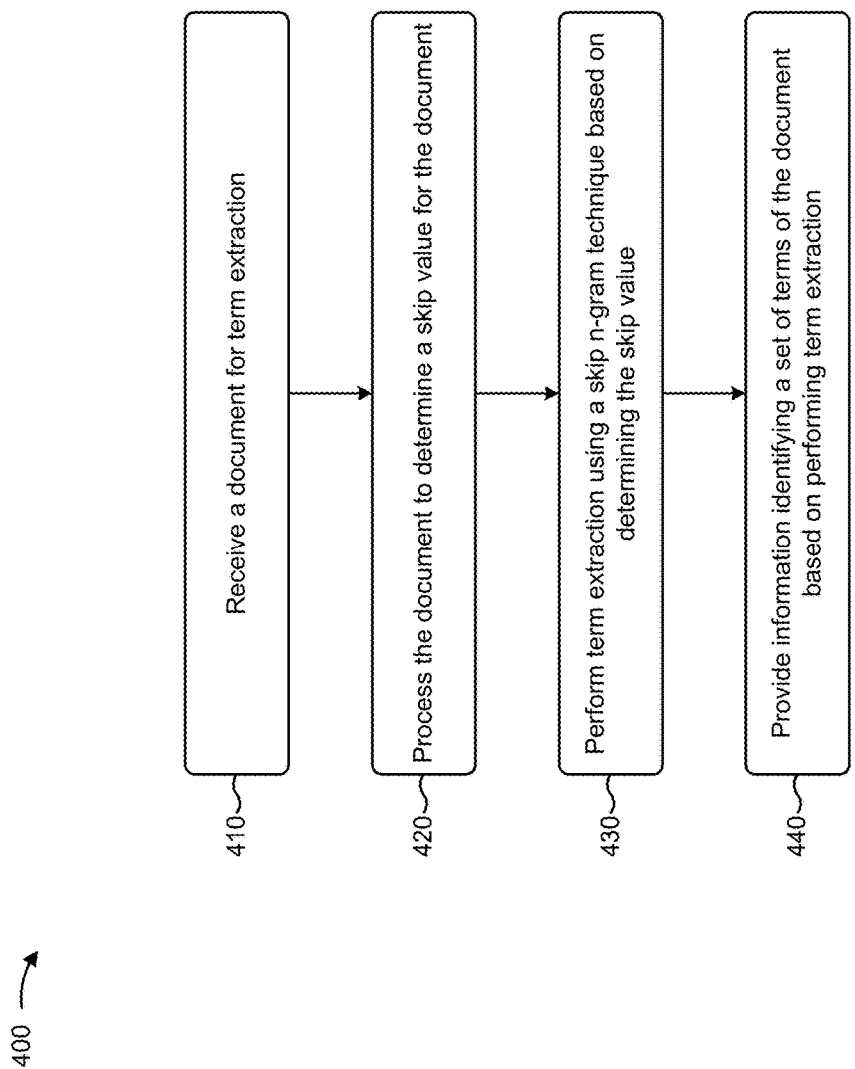
FIG. 4 is a flow chart of an example process for extracting a set of terms from a document.

FIG. 4 is a flow chart of an example process 400 for extracting a set of terms from a document. In some implementations, one or more process blocks of FIG. 4 may be performed by cloud platform 220. In some implementations, one or more process blocks of FIG. 4 may be performed by another device or a group of devices separate from or including cloud platform 220, such as client device 210.

As shown in FIG. 4, process 400 may include receiving a document for term extraction (block 410). For example, cloud platform 220 may receive the document for term extraction. In some implementations, cloud platform 220 may receive multiple documents. For example, cloud platform 220 may receive a corpus of all available textual materials from a particular industry, for a particular subject, or the like. In some implementations, the document may be a test script document, a requirements document, a medical text, a legal text, or the like.

Term extraction may include identifying a set of terms that are included in the document. The terms may include words, characters, phrases, functions, or the like. In some implementations, cloud platform 220 may receive the document from client device 210. In some implementations, cloud platform 220 may receive the document from a data structure, such as may be stored on client device 210. In some implementations, cloud platform 220 may receive a test script document for generating a functional diagram (e.g., an application flow diagram) representing the test script document, and may determine to perform term extraction to identify terms for the functional diagram.

As further shown in FIG. 4, process 400 may include processing the document to determine a skip value for the document (block 420). For example, cloud platform 220 may process the document to determine the skip value in preparation to perform a skip n-gram technique. The skip value for a skip n-gram may be a quantity k of words or characters that are omitted from an n-gram. For example, a word-based k-skip n-gram may include a sequence of n words, with as many as or exactly k words that are to be skipped over. In this case, a word may include a sequence of contiguous alphanumeric characters, which may also include particular non-alphanumeric characters that may be interpreted as part of a word (e.g., a dash "-" or an underscore "_") separated from another word by spaces or other types of non-alphanumeric characters. As an example, for the phrase "Call <Product_login>", "Call <*>" is a 3-gram of items "Call", "<", and ">", and "Product_login" is a 1-skip (a skip value of 1). As another example, for the phrase "This case is checking out bound sales.", "This case is checking ***." is a 5-gram of items "This," "case", "is", "checking", and ".", and "out bound sales" is a 3-skip of items "out", "bound", and "sales" (with a skip value of 3).

In some implementations, cloud platform 220 may determine the skip value based on processing the document using a pointwise mutual information technique to measure a level of association between groups (e.g., pairs or triplets) of words or characters. In some implementations, cloud platform 220 may determine the skip value based on determining one or more characteristics of the document. For example, cloud platform 220 may determine the skip value based on a quantity of words in the document, a type of the document, stored information regarding a similar document (e.g., another test script document), or the like. In some implementations, cloud platform 220 may determine the skip value based on a desired coverage. For example, cloud platform 220 may choose a relatively low skip value to only obtain relatively short terms and avoid capturing multiple different terms in a single term. As another example, cloud platform 220 may choose a relatively high skip value to obtain relatively long terms and avoid missing a term that includes multiple words (e.g., "out bound sales"). In some implementations, cloud platform 220 may select multiple skip values. For example, cloud platform 220 may perform multiple term extractions using multiple skip values to ensure that differently sized terms are captured.

As shown in FIG. 4, process 400 may include performing term extraction using a skip n-gram technique based on determining the skip value (block 430). For example, cloud platform 220 may perform the term extraction using a skip n-gram technique for n-grams of a particular n-gram size. In some implementations, cloud platform 220 may select the n-gram size based on a type of the document. Additionally, or alternatively, cloud platform 220 may select the n-gram size based on a type of term to be extracted. In some implementations, cloud platform 220 may select multiple n-gram sizes and perform multiple term extractions.

Based on performing the skip n-gram technique, cloud platform 220 may identify skip n-grams for performing the term extraction. For example, cloud platform 220 may identify word-based skip n-grams of word sequences that may skip a quantity of words indicated by the skip value. Additionally, or alternatively, cloud platform 220 may identify character-based skip n-grams of character sequences that may skip a quantity of characters indicated by the skip value.

In some implementations, cloud platform 220 may identify a subset of skip n-grams (e.g., a set of most common skip n-grams or a set of skip n-grams satisfying a threshold quantity of repetitions). For example, cloud platform 220 may select a particular quantity of skip n-grams, such as a threshold number of skip n-grams, a threshold percentage of skip n-grams, or the like. In some implementations, cloud platform 220 may rank the skip n-grams based on a quantity of occurrences, and may select the subset of skip n-grams based on ranking the subset of skip n-grams. In this case, cloud platform 220 may provide information associated with the quantity of occurrences, such as information that may be utilized to determine a semantic significance associated with a skip n-gram, a hierarchy associated with the skip n-gram or the like. For example, cloud platform 220 may identify a set of frequency values corresponding to a set of skip n-grams (e.g., a value of a frequency of a skip n-gram relative to one or more other skip n-grams), and may provide information identifying the set of frequency values.

In some implementations, cloud platform 220 may select a skipped word or a skipped character, from a skip n-gram, as a term. For example, in the phrase "call <Product_login>" where "call <*>" is a 1-skip 3-gram, "Product_login" may be selected as a term. In some implementations, cloud platform 220 may select all skipped words and/or all skipped characters to be terms. Additionally, or alternatively, cloud platform 220 may select only a portion of the skipped words or skipped characters. In some implementations, cloud platform 220 may rank the skipped words or characters and may select a subset of the skipped words or characters as terms, such as a particular quantity, a threshold quantity, a threshold percentage, or the like.

In some implementations, cloud platform 220 may perform another term extraction technique in addition to the skip n-gram technique described herein. For example, cloud platform 220 may perform an index terms based term extraction technique (e.g., extracting words occurring in an index), a technical terminology identification based term extraction technique (e.g., extracting words from a list of technical terminology, occurring in a corpus), a glossary based term extraction technique (e.g., extracting words in a glossary), or the like. As other examples, cloud platform 220 may perform a collocation of words based term extraction technique (e.g., extracting a word based on the word's position relative to one or more other words), a multi-word expressions based term extraction technique (e.g., extracting one or more multi-word expressions), or the like. As other examples, cloud platform 220 may perform a keywords based term extraction technique (e.g., extracting words corresponding to a list of keywords), a key-phrases based term extraction technique (e.g., extracting words corresponding to a set of key-phrases), a topics based term extraction technique (e.g., extracting words relating to one or more topics), or the like. In this way, based on performing multiple extraction techniques, cloud platform 220 may accomplish better coverage of terms.

As further shown in FIG. 4, process 400 may include providing information identifying a set of terms of the document based on performing term extraction (block 440). For example, cloud platform 220 may provide the information identifying the set of terms to client device 210. As another example, cloud platform 220 may provide the information identifying the set of terms to a data structure, such as may be stored on cloud platform 220, client device 210, or the like.

In some implementations, cloud platform 220 may provide the information identifying the set of terms for processing. For example, cloud platform 220 may provide the information to generate a functional diagram of a test script document from which the terms were extracted, as described herein in greater detail with reference to FIG. 6.

In some implementations, cloud platform 220 may provide a terms document including the set of terms. In some implementations, cloud platform 220 may provide information associated with the set of terms. For example, cloud platform 220 may provide information identifying a frequency of the set of terms, a ranking of the set of terms, a set of relationships associated with the set of terms (e.g., based on performing a relationship extraction technique, as described herein with regard to FIG. 6), a skip value, an n-gram size, or the like.

In some implementations, cloud platform 220 may perform a processing technique, and may provide results of the processing technique. For example, cloud platform 220 may generate a functional diagram using the terms, as described with reference to FIG. 1, and described in greater detail with reference to FIG. 6. As another example, cloud platform 220 may perform natural language processing using the terms. As another example, cloud platform 220 may generate a word cloud based on the terms.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
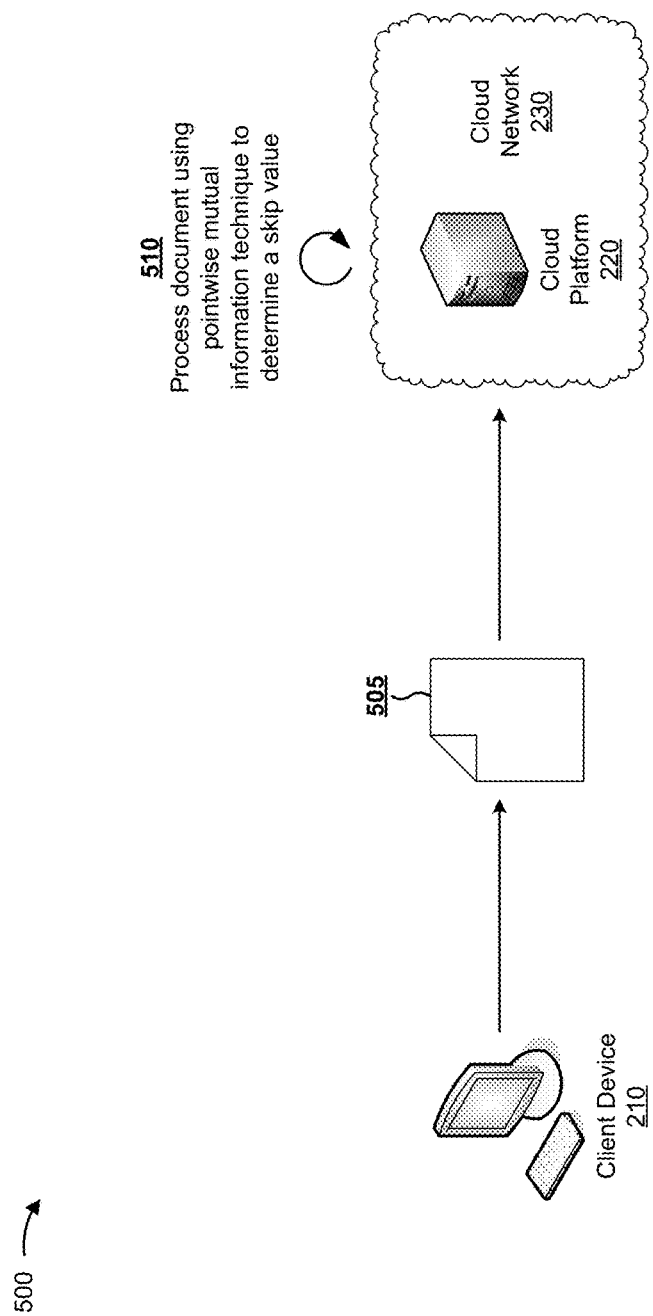
Figure 5B:
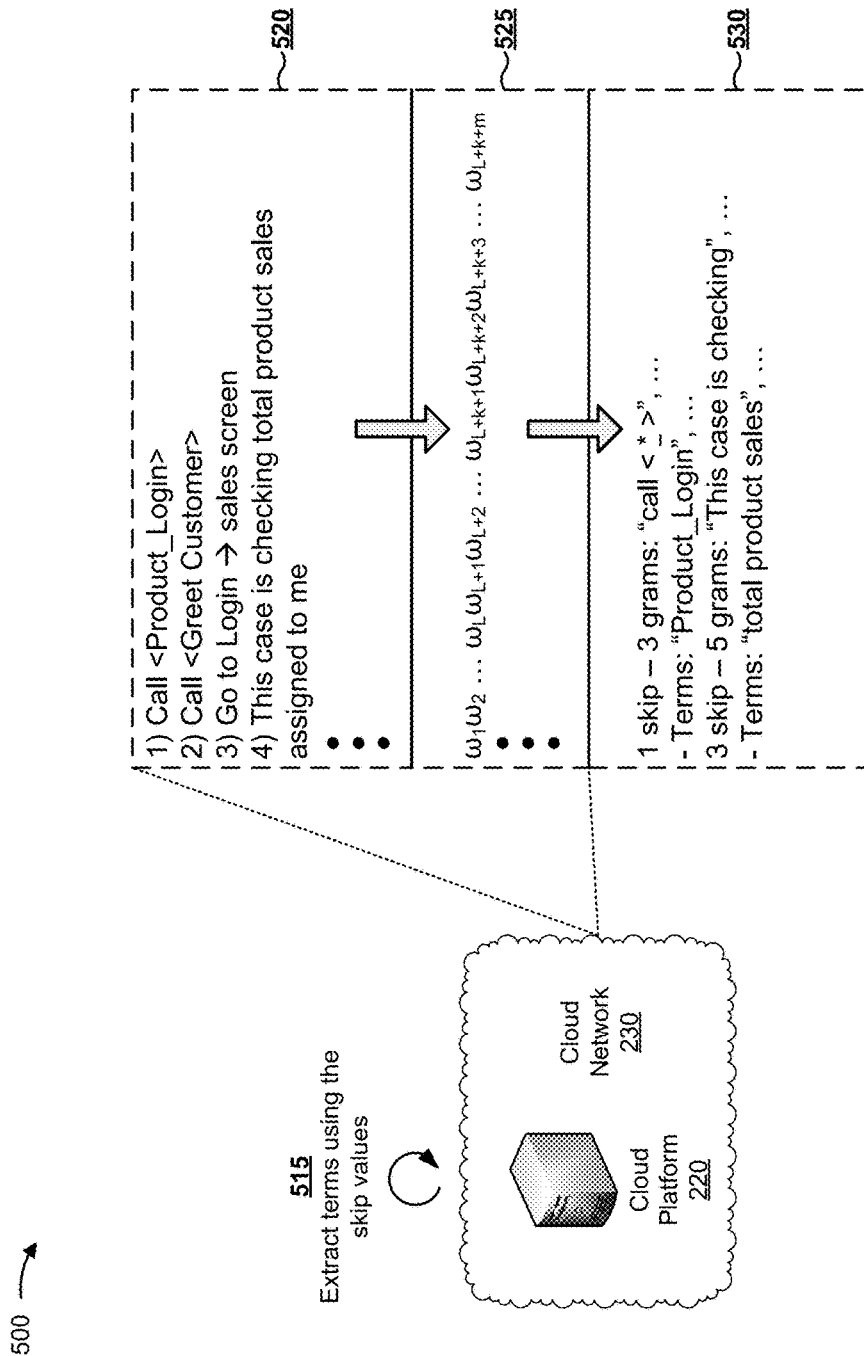

FIGS. 5A-5C are diagrams of an example implementation 500 relating to example process 400 shown in FIG. 4. FIGS. 5A-5C show an example of extracting a set of terms from a document.

As shown in FIG. 5A, example implementation 500 includes client device 210, cloud platform 220, and cloud network 230. As further shown in FIG. 5A, cloud platform 220 may receive test script document 505 from client device 210. As shown by reference number 510, cloud platform 220 may process test script document 505 using a pointwise mutual information technique to determine a skip value. For example, based on using the pointwise mutual information technique to analyze test script document 505, cloud platform 220 may determine a skip value of 1 for 3-grams that are to be identified and a skip value of 3 for 5-grams that are to be identified.

As shown in FIG. 5B, and by reference number 515, cloud platform 220 may extract terms using the skip values. For example, cloud platform 220 may perform term extraction using a k-skip n-gram technique where k is the skip value (e.g., a 1-skip 3-gram technique and a 3-skip 5-gram technique). As shown by reference number 520, the test script document may include a number of test scripts, such as test steps 1, 2, 3, 4, or the like. As shown by reference number 525, cloud platform 220 may represent words from the test scripts as skip n-grams. As shown by reference number 530, cloud platform 220 may select terms from the test scripts based on the words or characters that are skipped by the k-skip n-gram technique.

For example, cloud platform 220 may identify, from test script 1, a 1-skip 3-gram within "call <*>" where "*" represents up to one skipped word, and may identify "Product_Login" as the one skipped word to select "Product_Login" as a term. As another example, cloud platform 220 may identify, from test script 4, a 3-skip 5-gram "This case is checking * * * assigned" where "* * *" represents up to three skipped words, and may identify "total product sales" as the three skipped words to select "total product sales" as a term.

As shown in FIG. 5C, and as shown by reference number 535, cloud platform 220 may generate, based on the term extraction, a terms document that includes a set of extracted terms. For example, cloud platform 220 generates a terms document including a set of extracted terms, such as "Product_Login", "Card_Number", and "Total Product Sales". As shown by reference number 540, cloud platform 220 may provide the terms document to client device 210.

As indicated above, FIGS. 5A-5C are provided merely as an example. Other examples are possible and may differ from what was described with regard to FIGS. 5A-5C.

FIG. 6 is a flow chart of an example process 600 for generating a functional diagram of a test script document. In some implementations, one or more process blocks of FIG. 6 may be performed by cloud platform 220. In some implementations, one or more process blocks of FIG. 6 may be performed by another device or a group of devices separate from or including cloud platform 220, such as client device 210.

As shown in FIG. 6, process 600 may include receiving a test script document (block 610). For example, cloud platform 220 may receive the test script document. In some implementations, the test script document may be a corpus including a set of test scripts. In some implementations, cloud platform 220 may receive the test script document from client device 210. In some implementations, cloud platform 220 may obtain the test script document based on receiving a request (e.g., from client device 210).

As further shown in FIG. 6, process 600 may include performing term extraction for the test script document using one or more term extraction techniques (block 620). For example, cloud platform 220 may perform term extraction for the test script document to identify terms that are included in a set of test scripts of the test script document (e.g., a set of significant terms).

In some implementations, cloud platform 220 may perform term extraction utilizing a skip n-gram term extraction technique. For example, cloud platform 220 may identify frequently recurring skip n-grams, such as "call <*>", and may select skipped words from the skip n-grams, such as "Product_login" from the phrase "call <Product_login", as terms.

In some implementations, cloud platform 220 may utilize another term extraction technique, such as a regular expression pattern technique. For example, cloud platform 220 may identify special characters (e.g., quotation marks, mathematical operators, or parentheses), may identify regular expression patterns based on the special characters, and may select terms from the regular expression patterns. In this case, cloud platform 220 may identify a regular expression, such as "'Campaign ID'", and may extract "Campaign ID" as a term from the regular expression. In some implementations, cloud platform 220 may identify patterns of starting and ending special characters that are the same, such as words or characters bounded by quotation marks. Additionally, or alternatively, cloud platform 220 may identify patterns of starting and ending special characters that are related, such as words or characters bounded by parentheses, angle brackets, braces, or the like. For example, cloud platform 220 may identify "login" as a term from the pattern "<login>" based on "login" being bounded by the "<" and ">" term.

In some implementations, cloud platform 220 may utilize another term extraction technique. For example, cloud platform 220 may perform term extraction based on index terms, technical terminology, glossary terms, or the like. As other examples, cloud platform 220 may perform term extraction based on collocations of words, multi-word expressions, or the like. As other examples, cloud platform 220 may perform term extraction based on keywords, key-phrases, topics, or the like.

As shown in FIG. 6, process 600 may include performing hierarchy formation for the test script document based on results of performing term extraction (block 630). For example, cloud platform 220 may perform hierarchy formation for the test script document based on the results of performing term extraction.

In some implementations, cloud platform 220 may perform relationship extraction to identify relationships between terms. For example, cloud platform 220 may process the test script document to identify regular expressions to perform relationship extraction. In this case, for a regular expression "Term 1>Term2", cloud platform 220 may interpret ">" to mean Term 1 is greater than Term2. As another example, in the case of a regular expression "Term3->Term4", cloud platform 220 may interpret "->" to mean that Term4 follows Term3.

Additionally, or alternatively, cloud platform 220 may process the test script document to identify an identifier, such as a test step identifier, to perform relationship extraction. For example, cloud platform 220 may interpret "Step 1) Term5" and "Step 2) Term6" to mean that Term6 follows Term5. Additionally, or alternatively, cloud platform 220 may use an order of terms in the test script document to perform relationship extraction. Additionally, or alternatively, cloud platform 220 may use a machine learning technique to perform relationship extraction, such as a supervised machine learning technique or the like.

In some implementations, cloud platform 220 may utilize stored information relating to a hierarchy of terms (e.g., a term may be a parent or child of another term). For example, cloud platform 220 may use a tree type of data structure to store a set of terms based on determining a hierarchical relationship of the set of terms, and may extract a hierarchical relationship for the set of terms based on a hierarchical relationship associated with the tree type of data structure. Additionally, or alternatively, cloud platform 220 may use another type of data structure.

In some implementations, cloud platform 220 may identify duplicate terms, and may merge the duplicate terms. For example, cloud platform 220 may merge duplicate terms based on a quantity of duplicate terms (e.g., cloud platform 220 may merge a set of duplicate terms based on the frequency of the duplicate terms satisfying a threshold). As another example, in the case of a tree data structure or another data structure, cloud platform 220 may merge duplicate terms based on a quantity of children of duplicate terms (e.g., cloud platform 220 may avoid merging the duplicate terms if the frequency of the children of the duplicate terms satisfies a threshold). In this case, when duplicate terms are merged, children of each duplicate term may become children of a merged term.

As further shown in FIG. 6, process 600 may include generating a functional diagram of the test script document based on results of performing term extraction and hierarchy formation (block 640). For example, cloud platform 220 may generate the functional diagram as a graphical or textual representation of the relationships between terms of the test script document. In a case where terms have been merged, cloud platform 220 may generate the functional diagram as a graphical or textual representation of the relationships between the merged terms. In some implementations, the functional diagram may be an application flow diagram.

In some implementations, cloud platform 220 may generate a set of blocks to represent the set of terms and a set of connectors to represent a set of relationships among the terms. In some implementations, cloud platform 220 may generate multiple functional diagrams. For example, cloud platform 220 may generate a first functional diagram without merged terms and a second functional diagram with merged terms. Additionally, or alternatively, cloud platform 220 may generate a first functional diagram representing a first portion of software code that is to be tested by the test script and a second functional diagram representing a second portion of the software code that is to be tested by the test script.

In some implementations, cloud platform 220 may include contextual information in the functional diagram. For example, cloud platform 220 may include, in the functional diagram, an indication of a quantity of duplicates of a term, an indication of a strength of a relationship between a set of terms (e.g., a probability that a relationship shown between two terms is correct), or the like.

As further shown in FIG. 6, process 600 may include providing information identifying the functional diagram of the test script document (block 650). For example, cloud platform 220 may provide the information identifying the functional diagram.

In some implementations, cloud platform 220 may provide the information for display, such as via a user interface of client device 210. Additionally, or alternatively, cloud platform 220 may provide the information for storage, such as on a storage component of client device 210. In some implementations, cloud platform 220 may perform a coverage analysis using the functional diagram and may provide results of performing the coverage analysis.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of performing hierarchy formation for the test script document based on results of performing term extraction and generating a functional diagram based on performing hierarchy formation.

Figure 7A:
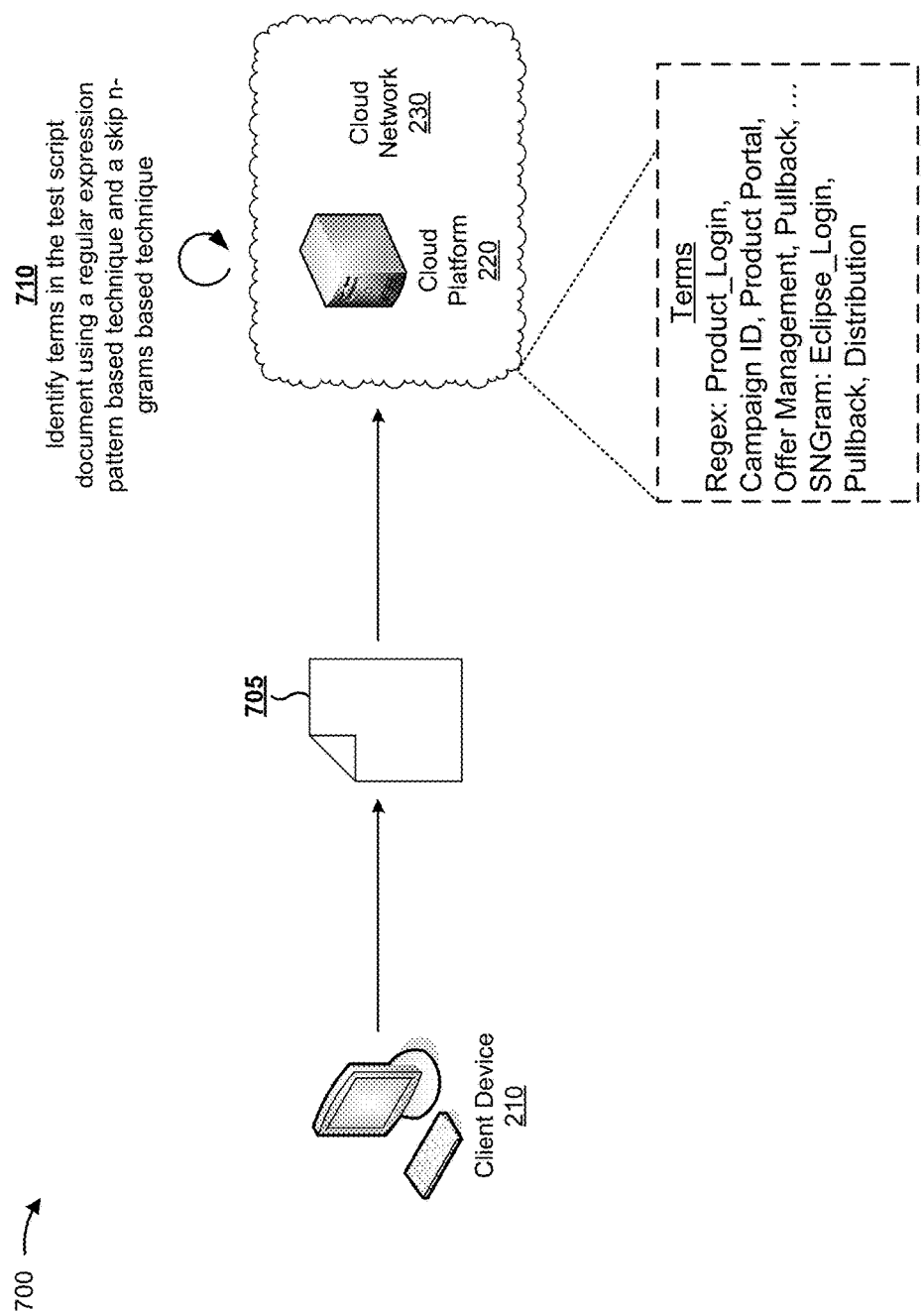
FIGS. 7A-7D are diagrams of an example implementation relating to the example process shown in FIG. 6.

As shown in FIG. 7A, example implementation 700 includes client device 210, cloud platform 220, and cloud network 230. As shown, cloud platform 220 may receive test script document 705, such as from client device 210. For example, cloud platform 220 may receive a request to generate a functional diagram representing a set of test scripts of test script document 705. As shown by reference number 710, cloud platform 220 may identify terms in test script document 705 using a regular expression pattern based term extraction technique and a skip n-gram term extraction technique, as described herein. For example, cloud platform 220 may identify "Product_Login", "Campaign ID", "Product Portal", or the like as terms.

Figure 7B:
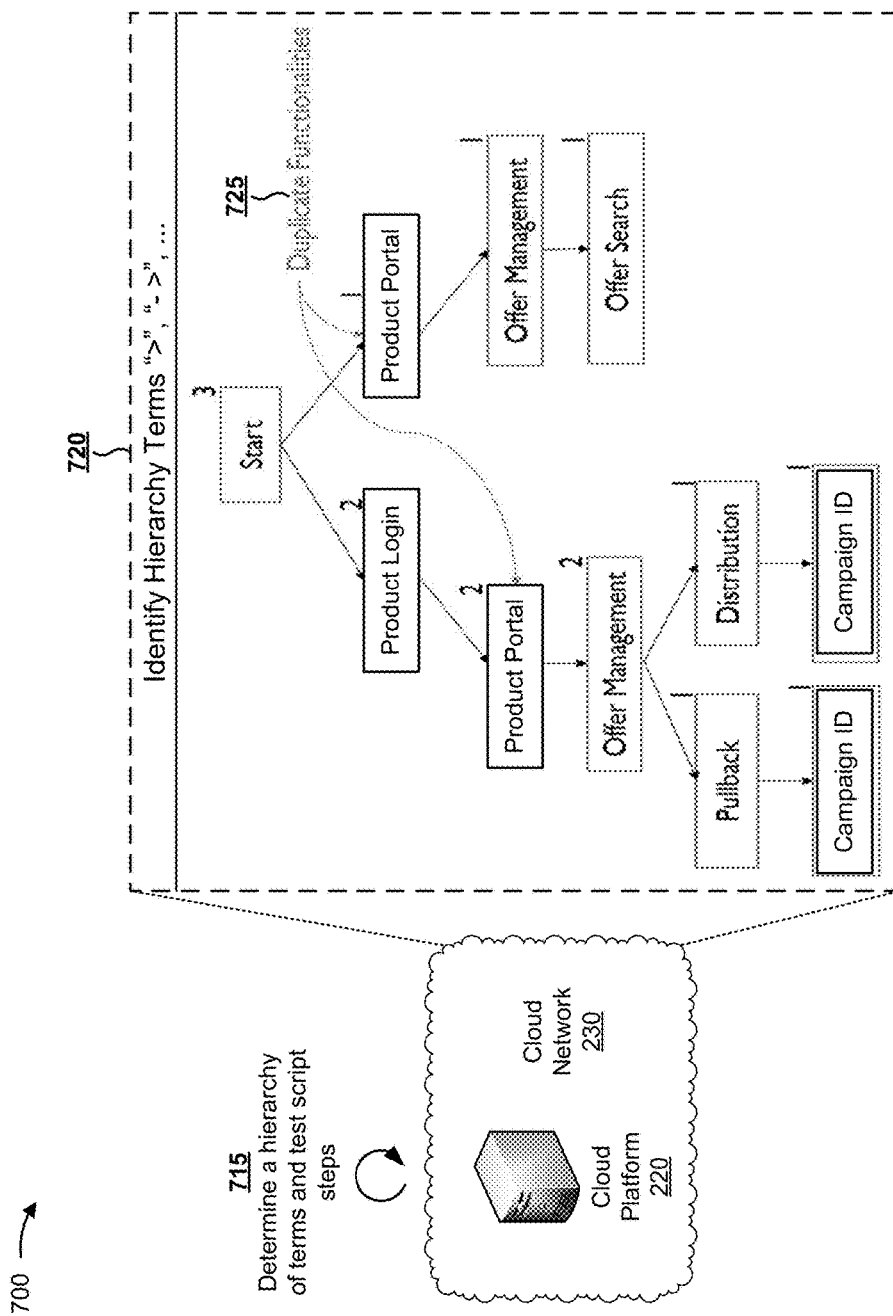

As shown in FIG. 7B, and as shown by reference number 715, cloud platform 220 may determine a hierarchy of terms and test script steps of the test script document, such as by performing relationship extraction. For example, if a test script includes the text "Product Portal->Offer Management-> Invoice", then cloud platform 220 may determine that "Invoice" is a child of "Offer Management" and that "Offer Management" is a child of "Product Portal", as shown. As another example, if a test script includes a sequence of steps in which Step 4 is "Call <Product_Login>" and Step 5 is "Go to Product Portal" then cloud platform 220 may determine that "Product Portal" is a child of "Product_Login", as shown. As shown by reference number 720, cloud platform 220 may generate a functional diagram based on the hierarchy of terms and test script steps. As shown by reference number 725, cloud platform 220 may identify a set of duplicate terms representing duplicate functionalities of test script document 705.

Figure 7C:
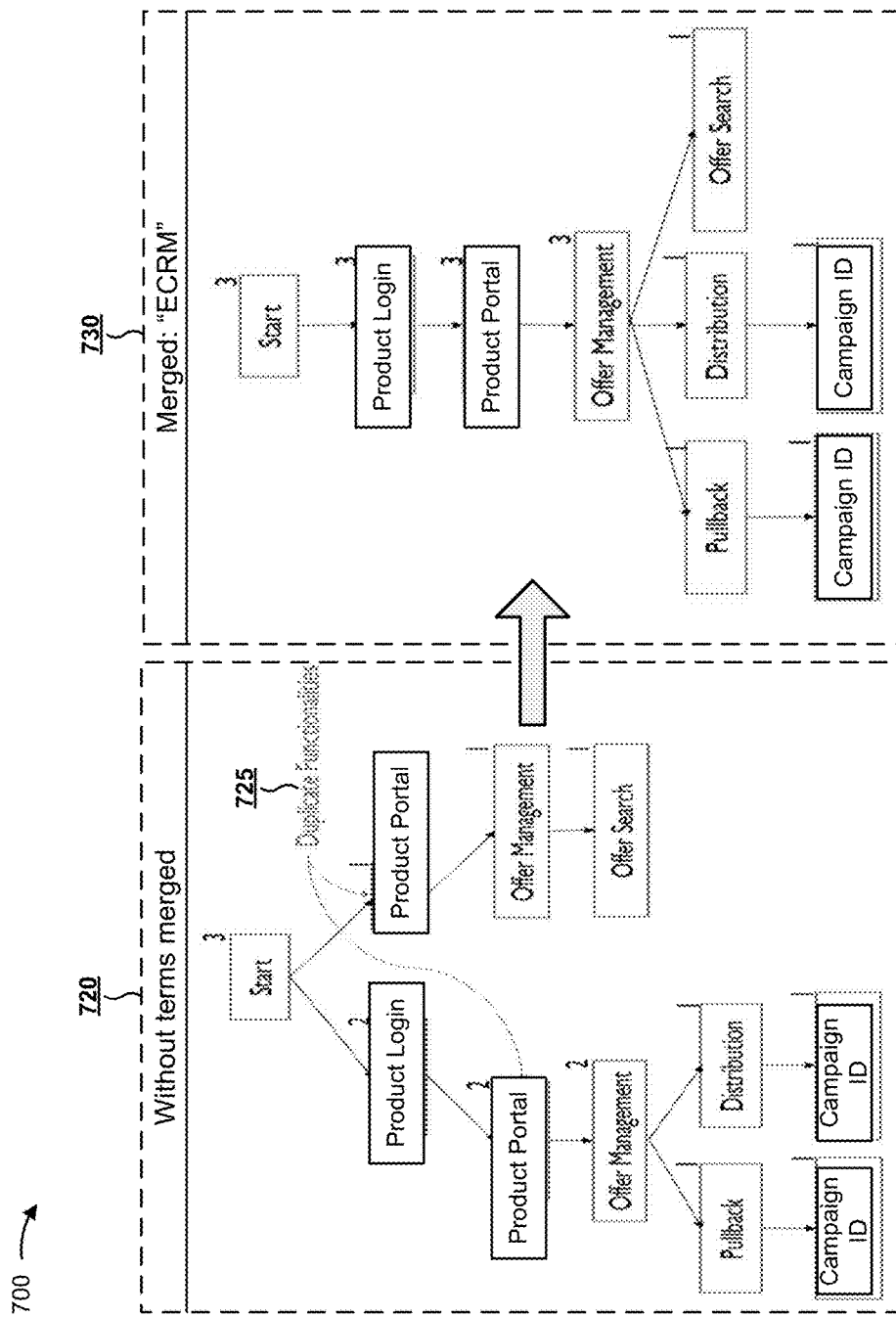

As shown in FIG. 7C, and by reference number 730, cloud platform 220 may merge the duplicate terms. For example, if "Product Portal" occurs at a first location and a second location in a tree data structure, cloud platform 220 may combine the "Product Portal" term from the second location into the "Product Portal" term at the first location. In doing so, cloud platform 220 may also merge the "Offer Management" term that is a child of the "Product Portal" term from the second location into the "Offer Management" term that is a child of the "Product Portal" term at the first location, and may add the "Offer Search" term that is a child of the "Offer Management" term from the second location to become a child of the "Offer Management" term at the first location. In this way, cloud platform 220 automatically consolidates multiple terms to reduce a complexity of the functional diagram.

Figure 7D:
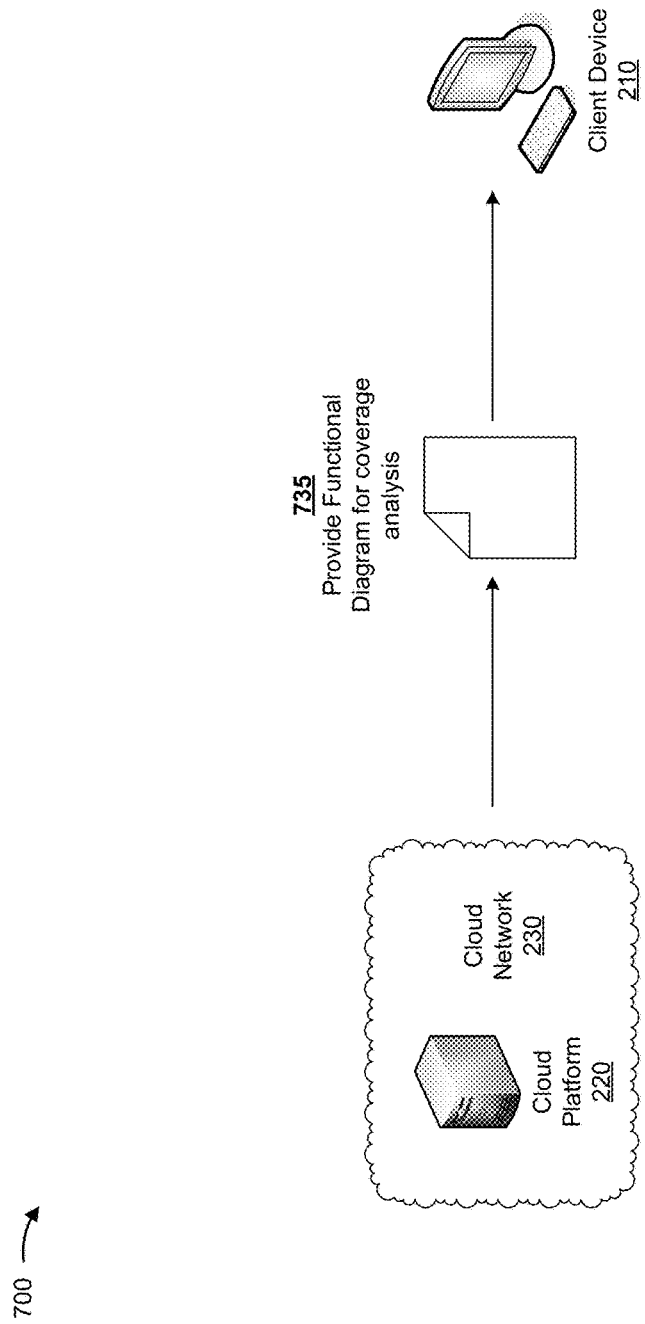

As shown in FIG. 7D, and as shown by reference number 735, cloud platform 220 may provide a functional diagram document (e.g., after processing by cloud platform 220) including the functional diagram, such as to client device 210, for coverage analysis.

As indicated above, FIGS. 7A-7D are provided merely as an example. Other examples are possible and may differ from what was described with regard to FIGS. 7A-7D.

In this way, cloud platform 220 automatically generates a functional diagram that represents a test script document. As a result, cloud platform 220 may reduce time required to generate a functional diagram, may reduce consumption of power and computing resources required to generate the functional diagram, and/or may improve accuracy of the functional diagram.

Moreover, cloud platform 220 may identify skip n-grams in a document (e.g., a test script document or other kind of document) and utilize words or characters included in the skip n-grams as terms for term extraction. As a result, the cloud platform may improve accuracy and efficiency of term extraction for documents, may reduce time required to perform term extraction, and may reduce consumption of power and computing resources required to perform term extraction relative to other term extraction techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code or software code) is to be broadly interpreted to include text-based code that may not require further processing to execute (e.g., C++ code, Java code, JavaScript code, another type of hardware and/or software based code that may be compiled and/or synthesized, or the like), binary code that may be executed, text files that may be executed in conjunction with other executables, source code, machine code, or the like. In some implementations, program code may include different combinations of the above-identified classes of code. Additionally, or alternatively, program code may be of any type, such as a function, a script, an object, or the like.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   obtain a test script document,
      the test script document including a set of test scripts;
   process the test script document to perform term extraction using one or more term extraction techniques to identify a set of terms of the test script document,
      the one or more term extraction techniques include a skip n-gram term extraction technique,
         one or more terms, of the set of terms, being located within an n-gram of the test script document,
         the n-gram being identified using the skip n-gram term extraction technique;
   process the test script document, using a machine learning technique, to perform hierarchy formation for results of performing term extraction,
      a relationship between a plurality of terms, of the set of terms, being identified using hierarchy formation;
   identify a set of duplicate terms of the set of terms;
   merge the set of duplicate terms to create one or more merged terms,
      one or more children, of the set of duplicate terms within the hierarchy formation, being used to form one or more children of the one or more merged terms based on the set of duplicate terms being merged;
   generate a functional diagram of the test script document based on a result of performing term extraction, a result of performing hierarchy formation, and a result of merging the set of duplicate terms; and
   provide, for display, information identifying the functional diagram.

2. The device of claim 1, where the one or more processors, when processing the test script document to perform term extraction, are to:

process the test script document using at least one of:
  a regular expression pattern based term extraction technique,
  a technical terminology identification based term extraction technique,
  a glossary based term extraction technique,
  a collocation of words based term extraction technique,
  a multi-word expressions based term extraction technique,
  a keywords based term extraction technique,
  a key-phrases based term extraction technique, or
  a topics based term extraction technique.

3. The device of claim 1, where the one or more processors, when processing the test script document to perform term extraction, are further to:
  determine a skip value associated with the skip n-gram term extraction technique;
  parse the test script document to identify a set of skip n-grams using the skip value; and
  identify the one or more terms based on parsing the test script document to identify the set of skip n-grams.

4. The device of claim 3, where the one or more processors are further to:
  identify a set of frequency values for the set of skip n-grams; and
  where the one or more processors, when identifying the one or more terms, are to:
    identify the one or more terms based on the set of frequency values.

5. The device of claim 3, where the one or more processors are further to:
  perform a pointwise mutual information technique on the test script document; and
  where the one or more processors, when determining the skip value, are to:
    determine the skip value based on results of performing the pointwise mutual information technique.

6. The device of claim 1, where the one or more processors, when processing the test script document to perform hierarchy formation, are to:
  identify a set of regular expressions included in the test script document; and
  determine the relationship between the plurality of terms based on a regular expression of the set of regular expressions.

7. The device of claim 1, where the one or more processors, when generating the functional diagram, are to:
  generate a set of blocks and a set of connectors to represent the set of terms and a set of relationships,
  the set of relationships including the relationship.

8. The device of claim 1, where the one or more processors, when merging the set of duplicate terms, are to:
  merge a group of terms, of the set of terms, hierarchically related to the set of duplicate terms.

9. A computer-readable medium storing instructions, the instructions comprising:
  one or more instructions that, when executed by one or more processors, cause the one or more processors to:
    obtain a test script document,
      the test script document including a set of test scripts for testing functionality of program code;
    extract a set of terms from the test script document using a plurality of term extraction techniques,
      the plurality of term extraction techniques including a skip n-gram term extraction technique;
    determine, using a machine learning technique, a set of relationships for the set of terms based on the test script document;
    determine that a plurality of terms, of the set of terms, are duplicate terms;
    merge the duplicate terms to create one or more merged terms,
      one or more children, of the duplicate terms within the set of relationships, being used to form one or more children of the one or more merged terms based on the duplicate terms being merged;
    generate a functional diagram representing the test script document based on a result of merging the duplicate terms and based on the set of relationships for the set of terms; and
    provide, for display, the functional diagram for display.

10. The computer-readable medium of claim 9, where the one or more instructions, that cause the one or more processors to extract the set of terms, cause the one or more or processors to:
  identify a plurality of skip n-grams in the test script document using the skip n-gram term extraction technique,
    a particular skip n-gram being a repeated set of words or set of characters with one or more words or one or more characters that do not repeat included in the repeated set of words or set of characters; and
  select the one or more words or one or more characters that do not repeat as a term of the set of terms.

11. The computer-readable medium of claim 9, where the one or more instructions, when executed by the one or more processors, further cause the one or more processors to:
  perform a coverage analysis of the program code using the functional diagram; and
  provide results of the coverage analysis of the program code for display.

12. The computer-readable medium of claim 9, where the one or more instructions, that cause the one or more processors to determine the set of relationships, cause the one or more or processors to:
  identify a particular character included in the test script document,
    the particular character being included in a set of characters associated with indicating relationships,
    the particular character indicating a particular relationship between a first term of the set of terms and a second term of the set of terms; and
  include the particular relationship in the set of relationships.

13. The computer-readable medium of claim 9, where the one or more instructions, when executed by the one or more processors, cause the one or more processors to:
  merge a plurality of relationships, of the set of relationships, associated with the set of terms.

14. A method, comprising:
  obtaining, by a device, a test script document,
    the test script document including a set of test scripts;
  processing, by the device, the test script document to perform term extraction using one or more term extraction techniques to identify a set of terms of the test script document;
  processing, by the device and using a machine learning technique, the test script document to perform hierarchy formation for results of performing term extraction,
    a relationship between a plurality of terms, of the set of terms, being identified using hierarchy formation;

identifying, by the device, a set of duplicate terms of the set of terms;

merging, by the device, the set of duplicate terms to create one or more merged terms, one or more children, of the set of duplicate terms within the hierarchy formation, being used to form one or more children of the one or more merged terms based on the set of duplicate terms being merged;

generating, by the device, a functional diagram of the test script document based on a result of performing term extraction, a result of performing hierarchy formation, and a result of merging the set of duplicate terms; and providing, by the device and for display, information identifying the functional diagram.

15. The method of claim 14, where processing the test script document to perform term extraction comprises:

extracting the set of terms from the test script document using a skip n-gram term extraction technique.

16. The method of claim 15, where extracting the set of terms from the test script document using the skip n-gram term extraction technique comprises:

determining a skip value for the test script document;

identifying a set of skip n-grams for the test script document using the skip value, a skip n-gram, of the set of skip n-grams, being a set of characters or a set of words associated with a threshold amount of repetitions in the test script document, the set of characters or the set of words including a skip value quantity of characters or words that are not associated with the threshold amount of repetitions; and selecting the set of terms based on characters or words, included in the set of skip n-grams, that are not associated with the threshold amount of repetitions.

17. The method of claim 14, where the functional diagram is an application flow diagram.

18. The device of claim 1, where the one or more processors, when merging the set of duplicate terms, are to:

merge the set of duplicate terms based on a quantity of the set of duplicate terms satisfying a threshold.

19. The computer-readable medium of claim 9, where the one or more instructions, that cause the one or more processors to merge the duplicate terms, cause the one or more processors to:

merge the duplicate terms based on a quantity of the one or more children, of the duplicate terms, not satisfying a threshold.

20. The computer-readable medium of claim 9, where the one or more instructions, when executed by the one or more processors, further cause the one or more processors to:

determine an order of the set of terms; and where the one or more instructions, that cause the one or more processors to determine the set of relationships for the set of terms, cause the one or more processors to:

determine, based on the order of the set of terms, the set of relationships for the set of terms.

\* \* \* \* \*